US008032895B2

(12) United States Patent
Thoelke (10) Patent No.: US 8,032,895 B2
(45) Date of Patent: Oct. 4, 2011

(54) INTER PROCESS COMMUNICATION IN A COMPUTING DEVICE

(75) Inventor: Andrew Thoelke, Hitchin (GB)

(73) Assignee: Nokia Corporation (FI)

( * ) Notice: Subject to any disclaimer, the term of this patent is extended or adjusted under 35 U.S.C. 154(b) by 1160 days.

(21) Appl. No.: 10/599,580

(22) PCT Filed: Apr. 1, 2005

(86) PCT No.: PCT/GB2005/001286
§ 371 (c)(1),
(2), (4) Date: May 15, 2007

(87) PCT Pub. No.: WO2005/096148
PCT Pub. Date: Oct. 13, 2005

(65) Prior Publication Data
US 2007/0266392 A1    Nov. 15, 2007

(30) Foreign Application Priority Data
Apr. 2, 2004    (GB) .................................. 0407545.3

(51) Int. Cl.
*G06F 9/44*    (2006.01)
*G06F 9/46*    (2006.01)
*G06F 13/00*    (2006.01)
*G06F 17/00*    (2006.01)
*G06F 7/04*    (2006.01)

(52) U.S. Cl. .................. 719/318; 719/313; 726/1; 726/2
(58) Field of Classification Search .......... 719/313–318; 726/1–2
See application file for complete search history.

(56) References Cited

U.S. PATENT DOCUMENTS

| 5,881,315 | A * | 3/1999 | Cohen ............................. 710/52 |
| 6,405,266 | B1 | 6/2002 | Bass et al. |
| 7,028,229 | B2 * | 4/2006 | McGuire et al. ................ 714/57 |
| 7,107,497 | B2 * | 9/2006 | McGuire et al. ................ 714/48 |
| 7,304,982 | B2 * | 12/2007 | Hondo et al. ................. 370/351 |
| 2002/0062401 | A1 | 5/2002 | Auslander et al. |

FOREIGN PATENT DOCUMENTS

| EP | 0 701 205 A2 | 3/1996 |
| GB | 2 354 848 A | 4/2001 |
| JP | 2001-516083 A | 9/2001 |
| WO | WO 99/09490 | 2/1999 |
| WO | WO 02/088949 A1 | 7/2002 |

OTHER PUBLICATIONS

International Search Report and Written Opinion for Application No. PCT/GB2005/001286 mailed Dec. 16, 2005.

(Continued)

*Primary Examiner* — Qing Wu
(74) *Attorney, Agent, or Firm* — Alston & Bird LLP (57) ABSTRACT

An operating system for a computing device comprises a kernel portion having a publish and subscribe facility for retrieving a property published by a first process and notifying the retrieved property to one or more further processes requesting to subscribe to that property. By providing the publish and subscribe mechanism within the operating system kernel, changes to properties can be notified to subscribers in real time and without the need for dedicated client server mechanisms. The publish and subscribe mechanism may be provided with access control properties established when a property is defined. The mechanism may also be used for a message and message queue facility in the computing device.

42 Claims, 1 Drawing Sheet

OTHER PUBLICATIONS

Search Report for Application No. GB 0407545.3 dated Mar. 31, 2005.
Office Action for Japanese Application No. 2007-505638 dated Sep. 29, 2010.
Reexamination Notification for China Application No. 200580015886.6 dated Apr. 2, 2011.
Notification of ground of rejection for Japanese Patent Application No. 2007-505638, mailed Mar. 22, 2011; 6 pages.
Bushman, F. et al.; "Software Architecture—System of Pattern for Software Development"; Published by Kindai Kagakushi Inc.; Nov. 30, 2000; pp. 333-337 (2002-00221-001).
Mauro, J.; "Lecture for Practicing Solaris"; Published by IDG Communications Inc.; Mar. 1, 1998; vol. 8; No. 3; pp. 87-93 (1998-01434-011).
Takano, Kiyoshi; "Creating parallel program in OS/2"; Information Processing; Publisher: Information Processing Society of Japan; Oct. 15, 2000; vol. 31; No. 10; pp. 1425-1432 (1998-00243-004).
Ogata, Masakazu, et al.; "Performance evaluation for multimedia processing of Real-Time Mach 3"; Technical Report of IPSJ; Publisher: Information Processing Society of Japan; Jul. 9, 1993; vol. 93; No. 58; pp. 67-74 (2000-00186-009).

* cited by examiner

Figure 1

INTER PROCESS COMMUNICATION IN A COMPUTING DEVICE

CROSS REFERENCE TO RELATED APPLICATIONS

This application claims the priority of PCT/GB2005/001286 filed on Apr. 1, 2005, and, GB 0407545.3 filed on Apr. 2, 2004, the entire contents of which are hereby incorporated in total by reference.

The present invention relates to a method for managing inter process communication (IPC) in a computing device, and in particular to an improved publish and subscribe mechanism whereby a property or event can be shared between a publisher of the property or event and one or more subscribers requiring to be notified of the property or event. The present invention also relates to a computing device arranged to manage such inter process communication, and also to computer software, and in particular an operating system for a computing device, for causing a computing device to manage such communications.

The term computing device as used herein is to be expansively construed to cover any form of electrical device and includes, data recording devices, such as digital still and movie cameras of any form factor, computers of any type or form, including hand held and personal computers, and communication devices of any form factor, including mobile phones, smart phones, communicators which combine communications, image recording and/or playback, and computing functionality within a single device, and other forms of wireless and wired information devices.

Most computing devices are programmed to operate under the control of an operating system. The operating system controls the computing device by way of a series of instructions, in the form of code, fed to a central processing unit of the computing device. These instructions can be regarded as a series of quasi-autonomous fundamental units of execution which are scheduled by the operating system. These fundamental units of execution are, respectively, known as threads and a process to be carried out in the computing device will invariably include one or more threads. A typical operating system will schedule many different threads in order to control the wide variety of tasks to be carried out by the computing device.

The operating system can be regarded as being made up of a number of components and some of these components have a more privileged access to the hardware resources of the computing device than other components. The components having more privileged access are known as privileged components. One or more of these privileged components form what is commonly known as the kernel of the operating system.

The kernel of the operating system runs what are generally known as user-mode programs in such a way that these programs can only access system resources through application program interfaces (APIs) with the kernel. User mode programs usually have a user interface and thus these programs are commonly known as applications. Each application running on the computing device runs in a process with its own virtual address space in the device memory, and the boundary between one application and another is known as a process boundary. Process boundaries ensure, therefore, that one application cannot accidentally overwrite the data of another because their memory address spaces are maintained entirely separate. Hence, a process may be regarded as the fundamental unit of protection within the operating system.

However, there are circumstances where it is necessary to effect communications across process boundaries and these are known as inter process communications (IPC). With inter process communications, the kernel must provide the mechanisms which enable the fundamental units of protection, i.e. the process boundaries, to be crossed in a secure manner so that these communications may be served. Most operating systems provide for one or more client/server mechanisms that underline communications with system servers.

In certain forms of computing devices, such as smart phones, there are many events that may happen in one process of the operating system that may also be of interest to other threads/processes of the operating system. Typical examples of these events are:

Telephony signal strength
Bluetooth connection/disconnection
Short Message Service (SMS) arrival
Incoming Infra Red (IR) transfer
Battery level.

While for each of these events there is normally one process that is primarily responsible for dealing with the event, there are often other threads in other processes that are also interested in the event; for example status displays.

Notifications of the above kinds of events, which need to cross process boundaries, have to date been addressed in some operating systems through the use of various notification servers. For example, notification servers such as System Agent server and Broadcast server are incorporated in the smart phone operating system known as Symbian OS™ available from Symbian Limited of London, England.

However, when there are several servers of the above type that are all carrying out very similar tasks, there are the attendant respective demands from each server on the overall system resources. Moreover, each of these servers may be regarded as a relatively 'heavyweight' server with associated relatively demanding resource requirements, so the overall demand on the system resources from the use of these servers is relatively high and, therefore, considered undesirable in computing devices having relatively constrained physical resources, such as smart phone.

Furthermore, the use of multiple servers of the above type requires, in essence, hardwired dependencies between the client/server interfaces, which in turn results restricts system architecture flexibility. For example, with some operating systems it is not possible to include communications ability in a ROM without including a particular notification server, even if that notification server is otherwise not required.

Additionally, smart phones have a number of global "system" states that affect the overall behaviour of the device. Examples of these global system states are:

Power state—on, off, charging, MP3 mode, etc
Profile state—silent, loud, handbag, etc
Network connection state—GPRS, 3G, GSM, no coverage, online/offline.

While some applications running on a device may be interested in changes in the status of a global system state, many are simply interested in the current state of the device, so as to decide how to behave at a particular point in time when an operation is to be carried out; e.g. to send an SMS message or queue for sending later, play a sound or not, react to key presses. Other states may not be global, but may need to be shared easily between various areas of the operating system and can be regarded, therefore, as a subset of a global state.

There is also a requirement for an operating system to manage some global states or values of a device. Certain operating systems already make use of such values, but presently, states of the above sort are not handled in a particularly efficient manner. Usually, special case code and random interfaces are used. For example, it is known to use an interface to the power model in the kernel, or to a particular server that is used to record that a phone is operating in a particular mode, such as MP3 mode. Hence, current systems do not handle global states well, and those mechanisms that do exist are product specific, ad-hoc and result in duplicated code.

'Persistence' states are typical examples of global systems values. Persistence states may be regarded as components that have state information that needs to be persistent, and there is also global state that needs to persist. Several components have state information that needs to be persistent, and there is also global state that needs to persist. Examples of these include default file names, local settings, user preferences etc. For some items, it is sufficient just to be able to obtain and set the values for the items, whereas other items require that certain threads are notified when the value of the item changes.

Historically, the operating system kernel needed access to the data being managed but for more recent operating systems this requirement no longer prevails; a generic solution that does require kernel knowledge of the data content is now considered preferable. Additionally, higher levels of system software have been proposed which use a particular system file to store such a state, but this is no longer considered desirable in the context of a secure operating system platform and an alternative solution is considered highly desirable.

It is also possible for one application running on a computing device to communicate directly with another application running on the device using a mechanism known as 'publish and subscribe'. With this known publish and subscribe mechanism, a first application (the publisher) establishes a property and a second application (the subscriber) is able to subscribe to that property as established by the first application. The publisher then publishes a new value for the property, and the particular subscriber is notified that the property has been changed. The subscriber may then retrieve the new value for that property. This known publish and subscribe mechanism derives from distributed systems and is implemented as middleware, with one application publishing and another application subscribing, with all communications between the two applications running on the side of a user outside of the kernel of the operating system. As such, there is no need to establish a specific client/server relationship between the two applications. However communications are restricted to between the two applications.

Therefore, it is an object of the present invention to provide an improved form of publish and subscribe mechanism which enables inter process communication in a computing device, and in particular a publish and subscribe facility, to be achieved in a more efficient manner, in real time, and with enhanced security.

BRIEF SUMMARY

According to a first aspect of the present invention there is provided a method of operating a computing device comprising arranging for a kernel portion of an operating system for the computing device to retrieve a property published within a first process and to notify the retrieved property to one or more further processes requesting to subscribe to the property.

According to a second aspect of the present invention there is provided a computing device arranged to operate in accordance with the method of the first aspect According to a third aspect of the present invention there is provided an operating system for causing a computing device according to the second aspect to operate in accordance with the method of the first aspect.

An embodiment of the present invention will now be described, by way of further example only.

An embodiment of the present invention will now be described, by way of further example only.

DETAILED DESCRIPTION OF THE INVENTION

The method of the present invention, which is referred to herein as 'P&S' provides both a means to store system-wide 'global variables' and a new inter process communication (IPC) mechanism for peer to peer communication between threads in an operating system for a computing device. The following example of the present invention is described with specific reference to the Symbian OS™ operating system, although it is to be appreciated that the present invention may also be used to equal advantage with other forms of computing device operating systems.

In the following embodiment of the present invention, there are three basic components to the P&S mechanism:

Properties—a property is a single data value, i.e. a single variable, identified by an integral key Publishers—threads that update a property Subscribers—threads that listen for changes to a property.

There are six basic operations that can be carried out on a property:

Define: Create a property variable and define its type and access controls

Delete: Remove a property from the system

Publish: Change the value of a property

Retrieve: Get the current value of a property

Subscribe: Register for notification of changes to a property

Unsubscribe: Deregister for notifications of changes.

In the present invention, P&S is provided as a kernel API that can be used by both user and kernel programs, via similar APIs, and thus can also provide an asynchronous communication mechanism between user and kernel code.

Figure 1:
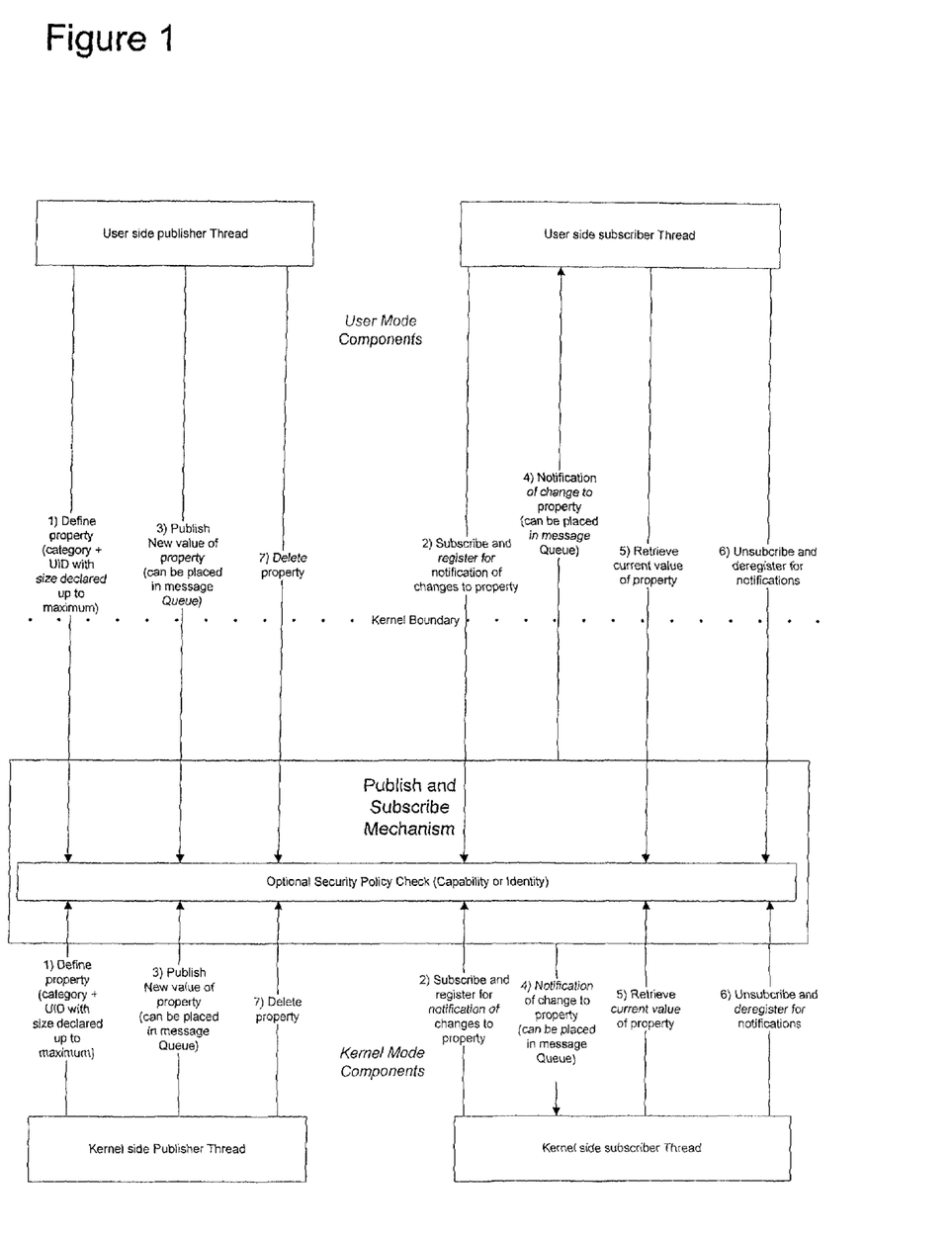
FIG. 1 illustrates a secure publish and subscribe system in accordance with the preferred embodiment of the invention.

This is illustrated in FIG. 1, which shows the basic architecture together with the sequence of basic operations.

As outlined previously, the use of one or more dedicated files is the current preferred solution for the storage of state information. Either a separate file may be used to store the state information for each application, or a global system file may be used to store the state information for all applications. However, if separate files are used, file proliferation results in duplicated code and gives rise to increased difficulty in identifying all necessary files. If a global system file is used, the global settings application becomes very difficult to achieve in practice. The use of a global system file for the state information for all applications has been identified in particular as a device performance bottleneck, especially at device start-up. This is because the file itself is a heavily contended resource during this initial period of device operation, and the file also includes an API that arranges for all clients which will require access to gain a read/write lock to the file, and for the file system to share information between threads.

Certain countermeasures have been proposed to improve device performance with the use of such global system files. For example, in the Symbian OS™ operating system for a smart phone including a communications ability, a relatively large amount of deadlock prevention code is provided within the communications code of the operating system to facilitate the operation of certain functions. However, the deadlock routines included in the communications code can give rise to subtle code discrepancies that are often not manifest until system integration and test, giving rise to development concerns. Furthermore, as more communications protocols are added to a device, the overall operating system becomes increasingly difficult to test. Additionally, the deadlock prevention code also leads to an increase in the number of dynamic link libraries (DLLs) in the operating system, each with its associated ROM space and therefore demand on the device resources.

Where asynchronous or 2-way messaging is needed, reversal of a client/server link has been used. However, within the notifier framework provided to support this functionality, it is usually necessary for all notifier providers to be located in dedicated DLLs, divorced from the actual applications in which they might logically be expected to be incorporated. This leads to a further increase in the number of DLLs in the operating system. The requirement for any increase in the number of DLLs can be regarded as particularly undesirable in a smart phone with its relatively constrained physical resources. Moreover, due to the lack of asynchronous messaging, it also becomes more difficult for a notifier to contact other servers during execution, as this can lead to deadlock. Hence, each of the above countermeasures may also be considered as giving rise to further concerns in the operating system.

The most common IPC mechanism used in computing device operating systems is the client/server framework. This mechanism is usually achieved via an asynchronous call that transfers a number of n-bit quantities from a client process to a server process. More data can then be transferred between threads of the processes using appropriate thread Read and thread Write calls.

To use a send and receive call, it is invariably necessary that the client and server threads must previously have established a client/server relationship. This can be achieved using an appropriate 'CreateSession' call. This mechanism is well proven, simple and robust, and is well-suited to many communication requirements. However, for some applications there are further concerns caused by these particular calls.

The CreateSession call is a synchronous call, as are Cancel calls between threads. Hence, when the client thread issues a CreateSession call, it is temporarily blocked, waiting for the server to respond to this call. Therefore, if there are two threads, A & B, that each depend on the other for services, deadlock can result because both threads are waiting for the other to complete their respective requests. Whilst examples of two servers being mutually dependant in this way are in practice relatively rare, deadlock is more common when a loop is formed between three or more servers. As the number of clients and servers in an operating system grows with additional device functionality, it can be appreciated that it becomes increasingly difficult to ensure that a new dependency does not introduce the possibility of deadlock; and testing for such potential deadlocks is a very difficult and time consuming process.

For transient servers, the CreateSession call is usually processed by attaching a handle to the call, which starts the server if it is not already running. The term handle will considered to be readily understood by those skilled in this art and will not, therefore, be described further in the context of the present invention. However, the use of a handle involves embedding the name of the executable which is to run into the code of the client application. This results in an inflexible system architecture because it is then not possible to have different components servicing requests without changing code. In other words, because through the use of a handle the CreateSession call now requires the name of a particular server to be specified, the client is, in essence, hard-wired as to which server is able to service its requests.

Because of the CreateSession call, the target server must be present when the client initiates a call to that target server. However, there are situations where the client sender of the information does not require any response from the target server, and does not need to know, in particular, whether or not the information sent to the target server has actually been received. In a computing device in the form of a smart phone, certain status updates such as battery level and communications activity are examples of this information. Therefore, with the client/server framework, the client is forced to depend on the server, even though the client is actually able to function without it. This additional dependency unnecessarily increases the couplings between components of the operating system, reducing system flexibility and making it more difficult to configure the operating system to different devices.

A client/server mechanism may, therefore, be regarded as far from ideal for interactions where entities are not in a client/server relationship but in a producer/consumer relationship. Client/server links cannot be reciprocal, but there are certain communications paths in the operating system that would be better served as two reciprocal links. As outlined above, one known way in which this drawback may be overcome is by duplicating in reverse a client/server link. But, this countermeasure leads to an increase in code complexity, with its attendant problems, as will be appreciated by those skilled in this art.

Hence, many of the concerns with the existing state and event solutions are related to the reliance on a client/server framework in the operating system. Any notification or state service requires a new server, and servers consume considerable resources, both RAM and ROM. Whilst a number of existing servers of an operating system may be extensible to provide this additional functionality, others are not; or there is no alternative solution. All of these result in further duplication of resources when an operating system is adapted for the development of a range of computing devices, such as when a number of different smart phones from various manufacturers are required to run under the control of a common operating system.

Currently, a mechanism has not yet been provided to enable truly asynchronous notification between threads, so intermediate servers have to be used. However, these intermediate servers in turn consume physical resources and can further compound the concerns detailed above.

The proposal of the present invention is, therefore, to provide a new form of publish and subscribe mechanism that is implemented in the operating system kernel. Such a P&S mechanism has many benefits over all of the above described publish and subscribe mechanisms, and is suitable for real time systems, whereby items of state information can be set and retrieved, and where subscribers can be notified that a state has changed in real time. This provides a very efficient mechanism for event notification and it can be appreciated that this results in a novel method of IPC in a computing device operating system.

The P&S mechanism of the present invention is considered to have the following significant advantages:
- many subscribers can monitor a property for changes
- circular dependencies between publishers and subscribers do not cause deadlock
- no memory is wasted storing values for a property that a subscriber does not want.

However, subscribers may not see every value a property takes, publishers do not know when and/or whether a subscriber has reacted to a new value as published, and it is difficult to provide a response to an event.

Therefore, P&S may be used to particular advantage when the following conditions hold:
- an event needs to be broadcast around a system
- only the latest value of a property is considered important, not intermediate values
- a thread that retrieves a value does not need to know where it came from
- a particular state or event needs to be made available at several places in a system.

It is also follows, therefore, that P&S is considered unsuitable if:
- a client needs services from a server
- a client needs a response to its request
- a client needs confirmation that a request has been completed, possibly with an error, even when an 'out of memory' condition may exist.

The provision of a P&S API as a kernel implementation also provides the following additional benefits:
- it allows the mechanism to be used also for communication between user and kernel code. Currently, in some operating systems specific device driver channels or hardware abstraction layer (HAL) functions are the only way to achieve this
- it can ensure that real-time tasks can publish properties without compromising their real-time guarantees—this is not possible for a client/server solution
- it is much more efficient in terms of performance—the context switch to and from the server process is eliminated, which can potentially result in dramatic performance improvement.
- it allows user code to make use of the persistence capability for certain items which otherwise would not be available for use by that user code.

In a preferred implementation of the present invention, properties to be published are identified by a 64-bit key made up of two 32-bit parts. The name space for a property is preferably divided into 'categories' identified by a unique identifier (UID). Each category preferably contains individual properties identified by a 32-bit 'key'—this may be just an index or other enumeration scheme for the category, or another UID if the category is designed to be generally extensible.

It is also envisaged that different types of properties may be used. For example, any property can be either a single 32-bit integral value, or a byte-array (descriptor) of between 0 and 512 bytes in length. Categories can contain a mixture of integral and byte-array properties. However, a property cannot change type once set, but a byte-array property can be set to a new value with a different length. For convenience, the P&S API is preferably provided with the ability to set and retrieve byte-array properties as Unicode text, in which case the underlying implementation just treats these as bytes.

The above limit on binary properties is considered desirable because it allows real time guarantees to be made for some of the system APIs using the P&S mechanism. Additionally, if arbitrary sized properties are supported, this would increase the likelihood that the P&S API is used inappropriately with two potential consequences:
- the entire set of properties is stored in kernel memory, so RAM use may increase unnecessarily.
- persistent properties are restored at boot time, so boot time could increase dramatically.

With the P&S API of the present invention, a notification that a property has changed is of the form "Property X has changed", rather than of the form "Property X has changed to Y". Thus, the new value for a property must be explicitly retrieved by a subscriber if it is required. Since the new value for a property is not included in a notification, multiple changes in the value of the property can be condensed into a single notification, rather than forcing all subscribers to process every intermediate value that a property has assumed. This helps avoid race conditions, since the notification request can be re-posted before the current value is retrieved, guaranteeing that an update will not be missed.

Other than system resource exhaustion, it is not necessary to impose a limit on the number of subscriptions to a single property. However, it is preferable to impose such a limit because if a limit on the number of subscriptions is not imposed, there is then a possibility that real-time performance can be affected.

With regard to the order of completion of subscriptions, these may either be defined or, alternatively, remain undefined. If the order is not defined, then completion will not occur in the order of the priority of the subscriber threads.

To meet real-time guarantees, any kernel action that requires a lock on a resource should be of bounded time. If not, other threads can be blocked from that resource for unbounded time, leading to missed deadlines. Property values are read and written atomically; i.e. as single undivided operations. This ensures that a thread reading any property does not obtain a garbled value, or multiple simultaneous garbled values which can be confused. However, this means that a lock has to be held for every update or retrieval operation. Therefore, the size of data that might be copied is preferably bounded so as to limit the time spent with the lock held. Additionally, because memory allocation is never real-time in an operating system, it is desirable that variable sized properties are pre-allocated to a pre-defined size of memory space, so that publishing each new value does not require a respective memory allocation operation. Memory allocation only then becomes necessary if the new property value is larger than the pre-defined storage allocation. If memory allocation does become necessary, any real-time guarantee for a publish operation becomes invalid.

If subscriptions are completed in the context of the publishing thread, this thread can be held up for an arbitrarily long period because there is no limit on the size of the subscription list being processed. Instead, subscriptions may be completed through the use of an alternative kernel thread (of known priority), allowing high priority threads to publish values in bounded time. A supervisor type thread in the operating system kernel can be used for this purpose. This type of thread is present in most operating systems and has primary responsibility for cleaning up activities and providing notification of non-time critical events to user-side code. It is particularly advantageous for the publication of a new value to a property to be a real time service, since it may be invoked from time-critical threads: for example a communication protocol in a smart phone might use the P&S API to indicate that a connection has been established. However, as outlined above, if there is an arbitrarily large number of subscriptions on any given property, the execution time becomes, in essence, unbounded and the real time guarantees become invalid. This drawback can be solved by using a deferred function call (DFC), queued on the supervisor thread, to carry out the actual completion of subscriptions: the use of deferred function calls is considered to be familiar to those skilled in this art and will not therefore be discussed further in the context of the present invention. The value of the property is updated by the publisher and the property is placed on a queue of properties for which notifications are outstanding. The queue is then drained by the DFC in the supervisor context and subscribers are notified.

Each category of property may be provided with a security policy which is defined at creation time. The policy preferably allows separate checks to be made for read- and write-access to properties in the category. Read access includes both retrieving and subscribing to a property. Each operation can have access controlled by capability or by Security Identifier (SID). Preferably, properties should be arranged so that they can only be removed from the operating system by the application that created them. This feature may also be controlled by SID.

Publish & Subscribe requires that only the category and property definitions are shared between publishers and subscribers. However, it is possible that the publisher may not even be present on the computing device storing the subscribers, but subscribers should still operate correctly and, moreover, in these circumstances it is important to ensure that malicious code is not able to masquerade as the publisher. Hence, any subscriber should operate correctly even when an attempt by that subscriber to retrieve a particular property is met with a response that the particular property has never been published; and also that subscription to a non-existent property is valid, and completes as expected when the property is first published.

With regard to the issue of malicious code, properties cannot be published until they have been created or defined. Hence, this issue may be resolved for system defined categories (e.g. Location based data) by setting the access control for a property when that property is defined, and ensuring that the access control cannot be changed subsequently for that property. However, to further ensure that authorised code only can publish a property the following two additional safeguards may also be adopted:

the property is defined during boot of the operating system, before unauthorised code has run—this ensures that a suitably strict policy is defined for publishing that property the property is arranged in a reserved category which only allows properties to be defined in the category by processes with a write-system-data capability.

The P&S API described so far does not include persistence—all properties are transient values. However, persistence of the property values may be provided by extending the P&S API through the addition of a 'persistence' attribute to a property, and providing an extra 'persistence' API. A trusted thread in the operating system can then be made responsible for retrieving changed properties and storing them in, for example a file, and also for restoring the stored properties during boot. Such a facility provides secure, real-time, global state for system components. To prevent unrestricted abuse of the persistence feature it is preferable to limit the storage of properties to those relating to system software only.

Persistence provided in the above manner does not provide synchronous persistence; i.e. an assurance that the new property value has been written to storage before continuing execution. If this feature is required, this may be provided by ensuring that changes to any property are directed into persistent storage shortly after being published. This provides an efficient solution to saving property changes. However, due to the importance of the data being stored, it is highly preferable to ensure that the storage algorithm used is sufficiently robust against failure partway through updating a property.

As part of normal shutdown of the operating system, the P&S API is arranged to commit outstanding changes to storage in order to ensure that property changes are not lost. But, in the case of a sudden and unexpected power failure it may not always possible to ensure that all changes in any property have been preserved. However, this is not considered problematical because such 'live' properties are no different to other live, uncommitted data in the operating system at the instant of power failure.

A message queue facility may also be provided as part of the P&S API. This is considered to be particularly suited to many present day trends for peer to peer communication. With the provision of this facility, the P&S mechanism can enable a publisher to send messages to a number of subscribing interested parties without that publisher needing to know whether or not any subscribing interested party is listening; neither is it necessary for that publisher to actually know the identity of any subscribing recipient.

The basic components of this feature of the P&S mechanism are messages and message queues. Messages may be regarded as structures that are placed onto queues for delivery to recipients. Each message queue defines the size of the messages it manages, and this size is usually limited by the operating system. A single queue can be shared between many message readers (subscribers) and message writers (publishers). Messages have an associated priority; higher priority messages are usually delivered before lower priority messages—effectively overtaking the lower priority messages in the queue. In the P&S mechanism of the present invention, the message queues may be provided as normal kernel objects to which a handle can be attached. In this way, the message queue 'object' can be opened by both the reader and the writer of a message in the queue.

Messages and message queues are not persistent, in that they do not persist after the last handle to the queue is closed. Thus, this facility may be regarded as being similar to the mailbox or message passing mechanisms implemented in certain existing operating systems. Therefore, the provision of a P&S API according to the present invention and incorporating such a message queue facility into a particular operating system has the additional benefit in that it can facilitate the porting of code from operating systems having mailbox and message passing mechanisms to that particular operating system.

There are five basic operations that need to be supported by such a P&S API having a message queue mechanism:

Creating/opening a message queue
Sending a message
Receiving a message
Waiting for space in the queue
Waiting for data in the queue.

The following calls may be used to read or write messages in a message queue:

A 'Write' function call may be used to place a message in the queue with the specified priority. For this to occur, the queue must have previously been opened. If the queue is full, a suitable error overflow request can be returned, such as KErrOverflow, instead of waiting for the queue to open. The caller can then use a 'Wait For Space' call if blocking of the error overflow request is required. The message will then be placed in the message queue as soon as space becomes available.

A 'Read' function call can be used to retrieve the highest priority message on the queue. Before this call becomes operative, the thread must have opened the message queue. If there are no messages on the queue, an underflow error request can be returned, such as KErrUnderflow, instead of waiting for a message to appear in the queue. The caller can then use a 'Wait For Data' call if blocking of the underflow error request is required, in which case a message will be notified to the party placing the Read call as soon as it appears in the message queue. Messages of the same priority on a message queue can be delivered in first in first out (FIFO) order.

An 'Open' function call can be used to register an interest in any message on a specified queue. If the queue does not exist, it is created, so this call can fail with no memory request being returned, such as KErrNoMemory. This Open call must be used before using a Read or a Write call. Queues can be identified by name, and this call can also specify the size of each message and the number of messages to provide space for.

A 'Wait for Space' call may also be used. This type of call is an asynchronous request which will complete when there is the specified amount of space (n message slots) available in the queue. However, it should be arranged that only a single thread can use this particular feature at any one time—if another thread is currently waiting for space it may cause the P&S API to panic.

A 'Wait For Data' call may also be used. This call is also an asynchronous request which will complete when there is the specified number of messages available in the queue. In common with the 'Wait For Space' call, only a single thread can use this feature at any one time—if another thread is currently waiting for data this will also cause the P&S API to panic.

A 'Close' call may be used to close the handle to the message queue. If there are no open handles to the queue when this call is used, the queue and any outstanding messages are deleted.

Although a P&S API according to the present invention could be implemented in the operating system as a user-side server using existing IPC mechanisms, a kernel implementation is considered to provide the following additional benefits:

it ensures the P&S functionality is a true peer with client/server IPC, and can provide similar performance for communicating with another process it can ensure that real-time tasks can use message queues without compromising their real-time guarantees. This is not the case for the current client/server based solutions for message queues.

Preferably, the maximum message size is limited. By limiting the maximum message size, a far simpler locking mechanism can be used for message queues. Furthermore, in particular, it has been found that limiting the message size to 36 bytes allows for a very fast implementation—the content of the message does not need to be manually copied across the user/kernel boundary, it can be passed in registers. The size of the message queue itself may be fixed by the first call to 'Open', which sets the message size and count. If further space for a message queue is subsequently allocated, this is likely to defeat any real time guarantees that might otherwise be made.

Message priorities can be provided and, typically, these can be arranged to lie within a range of 0 and 7. It is considered that supporting this range of priorities is not too burdensome on device RAM resource, even for queues that do not use priorities, but nevertheless provides a sufficient number of priority levels for sequencing messages in the message queue.

No support for security other than that available for standard kernel resources will be provided. Thus the object could be unsecured and globally accessible, private to a process, or anonymous but allowing access to be granted by existing handle owners.

In summary, the present invention provides a publish and subscribe mechanism which is implemented in the operating system kernel in a manner suitable for real-time systems. As such, the mechanism also allows the mechanism to be used for communication between user and kernel code, thus providing a solution to the concerns associated with the client/server architectures used to date. The mechanism is also able to ensure that real-time tasks can publish properties without compromising their real-time guarantees. This is not the case for any client/server solution. Additionally, because the context switch to and from the server process is eliminated, the mechanism is much more efficient in terms of overall operating system performance Although the present invention has been described with reference to a particular embodiment, it will be appreciated that modifications may be effected whilst remaining within the scope of the present invention as defined by the appended claims.

The invention claimed is:

1. A method comprising:
    causing a kernel portion of an operating system to retrieve a property published within a first process; and
    causing the kernel portion to notify the retrieved property to one or more further processes requesting to subscribe to the property,
    wherein the operating system is configured to supply a retrieved property in the form of a first part comprising a property name space and a second part comprising a property type,
    wherein the property type is provided with an access control policy defined when the property is created, and
    wherein the access control policy is defined during boot of the operating system.

2. A method according to claim 1 wherein the name space comprises a category part and a key part.

3. A method according to claim 2 wherein the category part comprises a unique identifier (UID).

4. A method according to claim 2 wherein the key part comprises a unique identifier (UID).

5. A method according to claim 2 wherein the name space comprises a 64-bit integer comprised of two 32-bit parts.

6. A method according to claim 1 wherein the property type comprises an integer value and/or a byte array descriptor.

7. A method according to claim 6 wherein the byte array descriptor is of variable length.

8. A method according to claim 6 wherein the integer value comprises 64.

9. A method according to claim 6 wherein the byte array descriptor comprises of between 0 and 512 bytes.

10. A method according to claim 6 wherein the byte array descriptor is provided in the form of Unicode text.

11. A method according to claim 1 wherein the access control policy cannot be changed after the property has been created.

12. A method according to claim 1 wherein the access control policy arranges the property in a reserved category which only allows a property to be defined in that category by a process having a write-system-data capability.

13. A method according to claim 1 wherein causing the kernel portion to notify comprises causing the kernel portion to notify to the one or more further processes only that the property has changed without specifying a new value for the retrieved property, thereby enabling notification of multiple changes in the value of the property by a single notification.

14. A method according to claim 1 wherein the kernel portion applies a limit on the number of further processes subscribing to the property.

15. A method according to claim 1 wherein the kernel portion is configured to define an order in which the property is notified to the one or more further processes, and wherein causing the kernel portion to notify comprises causing the kernel portion to notify in accordance with the defined order.

16. A method according to claim 1, further comprising causing the kernel portion to write the retrieved property to a memory space having a size which is predefined and not determined to the size of the retrieved property.

17. A method according to claim 16, further comprising causing the kernel portion to allocate further memory space for the writing of the retrieved property in an instance in which the retrieved property cannot be accommodated in the memory space of predefined size.

18. A method according to claim 1 wherein causing the kernel portion to notify comprises using a kernel thread of known priority to notify the retrieved property to the one or more further processes.

19. A method according to claim 18 wherein the kernel thread of known priority comprises a supervisor type thread of the operating system kernel.

20. A method according to claim 19, further comprising using a deferred function call queued on the supervisor type thread to notify the retrieved property to the one or more further processes.

21. A method according to claim 1 wherein the property is removable from the operating system only by a process which created it.

22. A method according to claim 21 wherein removal of a property from the operating system is controlled by a security identifier (SID).

23. A method according to claim 1 wherein retrieving and/or subscribing to the property is controlled by a security identifier (SID).

24. A method according to claim 1 wherein the property is provided with a persistence attribute.

25. A method according to claim 24 wherein the kernel portion is configured to direct the retrieved property into persistent storage.

26. A method according to claim 1 wherein the kernel portion is configured to commit any outstanding change to the property to storage as part of operating system shutdown.

27. A method according to claim 1 wherein the property comprises a message queue facility comprising a message and message queue.

28. A method according to claim 27 wherein the message queue is provided with a handle for enabling a message queue object to be opened by a reader and/or a writer of a message in the message queue.

29. A method according to claim 27 wherein the kernel portion limits the maximum size of message that can be placed in the message queue.

30. A method according to claim 29 wherein the maximum message size is 36 bytes.

31. A method according to claim 27 wherein the size of the message queue is fixed by a first call to open the message queue.

32. A method according to claim 27 wherein messages placed in the message queue are provided with a priority level for sequencing messages in the message queue.

33. A method according to claim 32 wherein seven priority levels are provided for messages sequenced in the message queue.

34. A method according to claim 32 wherein messages in the message queue having the same priority level are delivered from the message queue on a first in first out basis.

35. A method according to claim 27 wherein a wait for space facility is provided for enabling, when the message queue is full when a call is made by a party to place a message on that message queue, the message to be placed on the message queue as soon as space becomes available on the message queue without the need for a further call from that party.

36. A method according to claim 27 wherein a wait for data facility is provided for enabling, when no messages are present on the message queue when a request to retrieve a message on the message queue is received from a party, a message appearing on the message queue to be notified to that party without the need for a further call from that party.

37. An apparatus comprising a processor and a memory storing computer program code, wherein the memory and stored computer program code are configured, with the processor, to cause the apparatus to at least:
cause a kernel portion of an operating system to retrieve a property published within a first process; and
cause the kernel portion to notify the retrieved property to one or more further processes requesting to subscribe to the property,
wherein the operating system is configured to supply a retrieved property in the form of a first part comprising a property name space and a second part comprising a property type,
wherein the property type is provided with an access control policy defined when the property is created, and
wherein the access control policy is defined during boot of the operating system.

38. An apparatus according to claim 37, wherein the memory and stored computer program code are configured, with the processor, to cause the apparatus to cause the kernel portion to notify by causing the kernel portion to notify to the one or more further processes only that the property has changed without specifying a new value for the retrieved property, thereby enabling notification of multiple changes in the value of the property by a single notification.

39. An apparatus according to claim 37, wherein the memory and stored computer program code are configured, with the processor, to cause the apparatus to cause the kernel portion to notify at least in part by using a kernel thread of known priority to notify the retrieved property to the one or more further processes.

40. An apparatus according to claim 37, wherein the property is removable from the operating system only by a process which created it.

41. An apparatus according to claim 37, wherein the property comprises a message queue facility comprising a message and a message queue.

42. A non-transitory memory having computer-readable program instructions stored therein, the computer-readable program instructions comprising program instructions configured to cause an apparatus to perform a method comprising:
causing a kernel portion of an operating system to retrieve a property published within a first process; and causing the kernel portion to notify the retrieved property to one or more further processes requesting to subscribe to the property, wherein the operating system is configured to supply a retrieved property in the form of a first part comprising a property name space and a second part comprising a property type, wherein the property type is provided with an access control policy defined when the property is created, and wherein the access control policy is defined during boot of the operating system.

* * * * *